(12) United States Patent
Sharpes

(10) Patent No.: US 10,641,367 B2
(45) Date of Patent: May 5, 2020

(54) ROTATION OF A PINION GEAR

(71) Applicant: The Government of the United States, as represented by the Secretary of the Army, Washington, DC (US)

(72) Inventor: Nathan Sharpes, Abingdon, MD (US)

(73) Assignee: The Government of the United States, as represented but the Secretary of the Army, Washington, DC (US)

( * ) Notice: Subject to any disclaimer, the term of this patent is extended or adjusted under 35 U.S.C. 154(b) by 0 days.

(21) Appl. No.: 15/827,301

(22) Filed: Nov. 30, 2017

(65) Prior Publication Data

US 2019/0162277 A1 May 30, 2019

(51) Int. Cl.
*F16H 19/04* (2006.01)
*H02K 7/18* (2006.01)
*F16H 35/02* (2006.01)
*A43B 3/00* (2006.01)

(52) U.S. Cl.
CPC ............ *F16H 19/043* (2013.01); *F16H 35/02* (2013.01); *H02K 7/1853* (2013.01); *H02K 7/1861* (2013.01); *A43B 3/0015* (2013.01)

(58) Field of Classification Search
CPC .................................................... F16H 19/043
USPC ........................................................ 320/107
See application file for complete search history.

(56) References Cited

U.S. PATENT DOCUMENTS

| | | | |
|---|---|---|---|
| 2,973,658 A | 3/1961 | Bishop | |
| 3,064,491 A | 11/1962 | Bishop | |
| 3,908,479 A | 9/1975 | MacDuff | |
| 4,444,070 A | 4/1984 | Yanai | |
| 4,475,413 A | 10/1984 | Higuchi | |
| 8,970,054 B2 | 3/2015 | Stanton et al. | |
| 9,166,427 B2 * | 10/2015 | Panos | H02K 7/1853 |
| 9,190,886 B2 | 11/2015 | Stanton et al. | |
| 9,693,605 B2 * | 7/2017 | Beers | A61F 5/028 |
| 2008/0257085 A1 | 10/2008 | Bless et al. | |
| 2009/0200983 A1 * | 8/2009 | Dyer | H02J 7/32 320/107 |
| 2013/0020986 A1 * | 1/2013 | Linzon | A43B 3/0015 320/107 |
| 2014/0368157 A1 | 12/2014 | Alexander et al. | |
| 2015/0059204 A1 | 3/2015 | Alexander et al. | |
| 2015/0162803 A1 * | 6/2015 | Stanton | H02K 7/1861 290/1 C |
| 2019/0159543 A1 * | 5/2019 | Sharpes | A43B 3/0015 |

\* cited by examiner

*Primary Examiner* — Richard V Muralidar
(74) *Attorney, Agent, or Firm* — Ronald Krosky; Azza Jayaprakash

(57) ABSTRACT

A pinion gear, with a varied gear ratio, can be inline with a rack. When the rack moves, the pinion gear can rotate. This rotation can cause an interior of an electrical generator to rotate. Rotation of the interior of the electrical generator can cause an electricity to be produced and outputted.

20 Claims, 15 Drawing Sheets

US 10,641,367 B2

ROTATION OF A PINION GEAR

GOVERNMENT INTEREST

The innovation described herein may be manufactured, used, imported, sold, and licensed by or for the Government of the United States of America without the payment of any royalty thereon or therefor.

BACKGROUND

Electronic devices have a wide variety of uses and applications in modern society. These electronic devices use electrical energy to function. In one example, this energy is derived from a battery. As the devices are used, the battery level lowers and ultimately reaches a level so low that the electronic device does not function without a new battery, which can be expensive, or the battery being recharged. Therefore, it can be valuable to recharge a battery.

SUMMARY

In one embodiment, a system can comprise a rack and a pinion gear physically coupled to the rack. When the rack moves laterally, the pinion gear can experience a rotation. The rack and pinion gear can be inline.

In another embodiment, a system comprise a pinion gear with a varied gear ratio and a coupling mechanism configured to couple the pinion gear to an electrical generator. When the pinion gear experiences a rotation, the coupling mechanism can experience a rotation. The rotation of the coupling mechanism can cause rotation of at least part of the electrical generator such that the electrical generator produces an electricity.

In yet another embodiment, a method can be performed by shoe insole. The method can comprise receiving a pressure from a downward step and moving a rack in response to the pressure from the downward step. Moving the rack can cause a pinion gear with a variable gear ratio to rotate. Rotation of the pinion gear can cause a generator to rotate.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
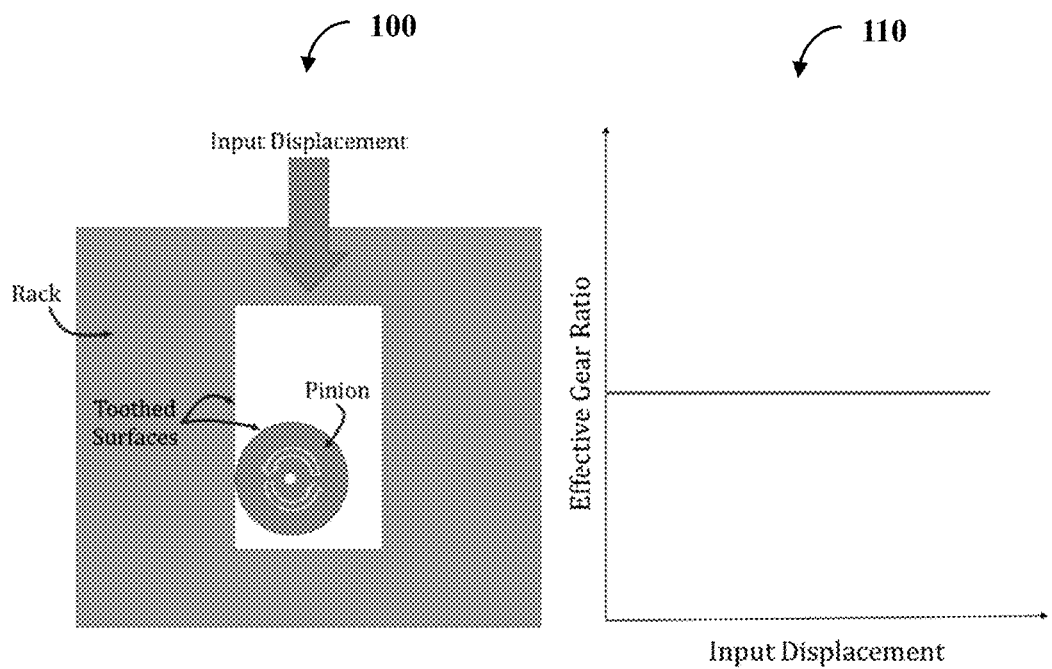
FIG. 1 illustrates one embodiment of a system and a graph.

A person can wear a shoe, such as a combat boot, with an energy harvester. As an example, the energy harvester can be part of an insole. This energy harvester can convert movement from a heel strike into rotational movement. This rotational movement can cause an interior of an electrical generator to rotate. This interior rotation can cause an electricity to be produced. This electricity can be used to charge a battery.

The conversion of the heel strike to rotational movement to ultimately produce the energy can occur by way of a rack and pinion system. The rack and a pinion gear can be inline with one another. As the rack moves, the pinion gear rotates. The pinion gear can have a variable gear ratio so that the gear ratio is lower at a start to overcome initial resting inertia and increase so the gear ratio is higher toward an end of rotation to increase (e.g., maximize) rotation speed.

Since there is the initial resting inertia to overcome, the insole can include an electrical clutch. Example electrical clutches can include a button/switch or a potentiometer. This way the electrical generator is not engaged throughout the rotation, but instead during a later phase of rotation. With this, more energy can be dedicated with overcoming inertia at a start of the rotation while more energy can be dedicated toward generation rotation at an end of the rotation.

The insole can also include a mechanical clutch, such as a ratchet mechanism. With the mechanical clutch, the electrical generator can over-run or spin faster than an input gear train. With this, the electrical generator can continue to rotate after a heel strike is completed, allowing more electricity to be produced. Additionally, the mechanical clutch can allow the insole to reset quickly to a pre-heel strike state.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action (s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of a system 100 and a graph 110. With the system, a rack can have a toothed surface that engages with a toothed surface of a pinion (the toothed surface making the pinion into a pinion gear). Therefore, the pinion is physically coupled to the rack by this toothed engagement. The rack and pinion can be inline meaning that they occupy about the same plane. When the rack moves laterally, such as in response to the input displacement, the pinion gear experiences a rotation.

With FIG. 1, the pinion is round and therefore has a fixed gear ratio. Therefore, the gear ratio does not change wherever the rack is translated from the input displacement. This lack of change is illustrated in the graph 110.

Figure 2:
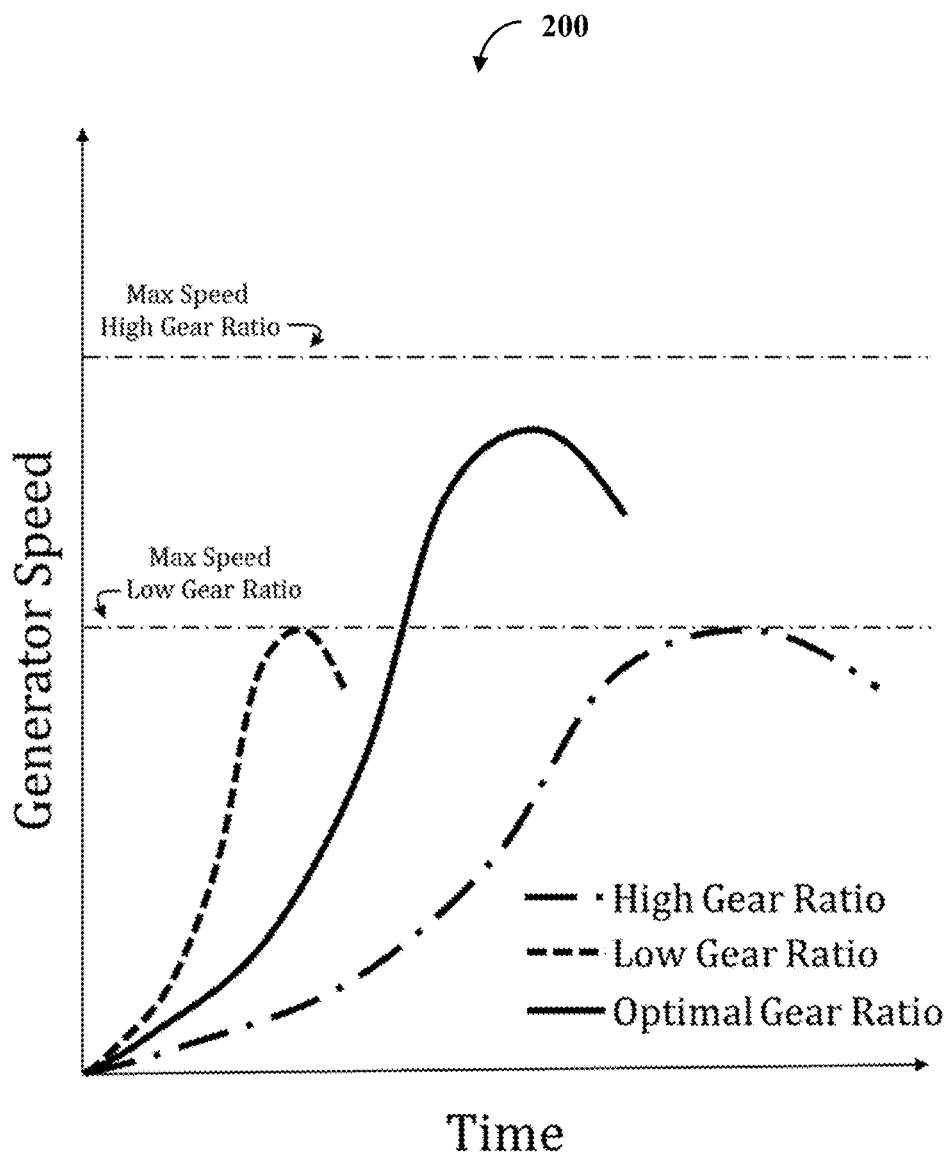
FIG. 2 illustrates one embodiment of a graph of generator speed versus time.

FIG. 2 illustrates one embodiment of a graph 200 of generator speed versus time. The pinion from FIG. 1 can be coupled to an electrical generator. As the pinion rotates, an interior portion of the electrical generator can rotate to cause an electricity to be produced. The graph 200 illustrates several options for the gear ratio—a low gear ratio, a high gear ratio, and an optimal gear ratio.

For a gear ratio, there is an initial inertia to be overcome. A basic concept is that it takes more force to move the rack from a standstill than when already in motion. Depending on the gear ratio chosen, the initial force required to move the rack will be different.

With the low gear ratio, the initial force required to move the rack would be lower and therefore take less time. Less time dedicated to initially moving the rack and pinion would lead to the generator reaching maximum achievable speed. However, this gear ratio would limit a final achievable speed of the pinion and in turn lead to lower generator speed. The lower the generator speed, the less electricity that is produced.

A high gear ratio would allow for the generator to spin the fastest. However, the initial force to move the rack would be greater and therefore take more time. Due to the limited physical range in the rack, the pinion cannot rotate enough for the maximum speed to be achieved. What this means in practical terms is that the high gear ratio is of little value in that the maximum speed is not obtainable in view of physical limitations of the rack and pinion gear.

Therefore, an optimal gear ratio would allow for a balance between generator speed and initial force required to move the rack and spin the pinion. This would allow for the generator to spin faster than the high or low ratio. In addition, the maximum spinning could be for a longer duration. This ultimately allows for more electricity to be produced from the same input displacement discussed with FIG. 1.

Figure 3:
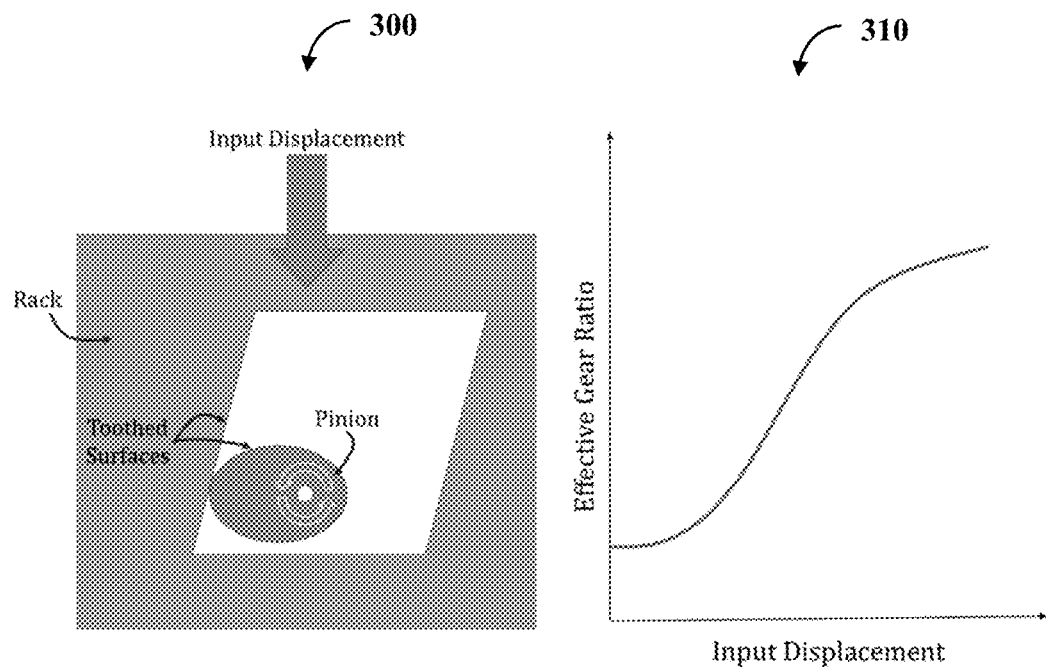
FIG. 3 illustrates one embodiment of a system and a graph.

FIG. 3 illustrates one embodiment of a system 300 and a graph 310. The system 300 has a rack and pinion with toothed surfaces. The rack moves from an input displacement. However, as opposed to the system 100 of FIG. 1, the pinion can have a varied gear ratio. With this, the pinion is not circular, but of a non-circular shape to facilitate the varied gear nature. As illustrated with the system 300, the pinion is an oval. The pinion, as shown by the white circle, can be coupled to the electrical generator by way of a coupling mechanism (e.g., a screw). As illustrated, the pinion can be coupled to the coupling mechanism outside a center of the pinion.

The graph 310 illustrates the effective gear ratio of the pinion as the pinion rotates. In other words, the gear ratio that engages with the pinion. As the initial displacement becomes greater (the rack moves more), the gear ratio increases. With the system 300, the change of gear ratio is not constant. With this, the pinion has a larger start radius and a smaller end radius.

Figure 4:
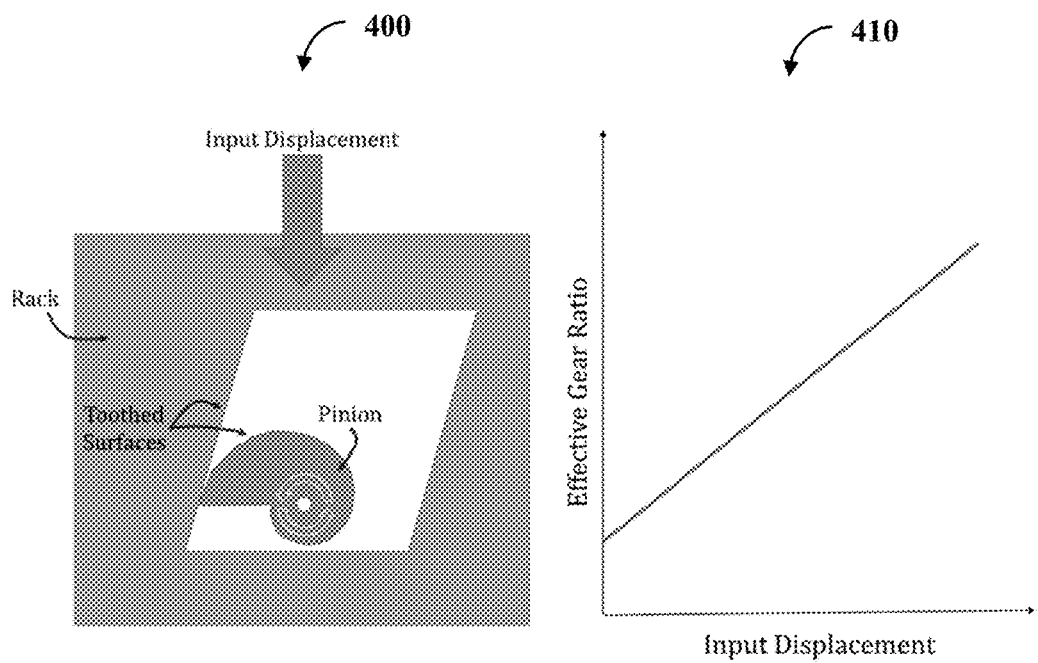
FIG. 4 illustrates one embodiment of a system and a graph.

FIG. 4 illustrates one embodiment of a system 400 and a graph 410. The system 400 has a rack and pinion with toothed surfaces. The rack moves from an input displacement. Here, the pinion has a varied gear ratio as with the system 300 of FIG. 3, but is configured in a different manner. The pinion is spiral shaped and provides a gradual and constant change for the gear ratio against the input displacement that is illustrated in the graph 410.

Figure 5:
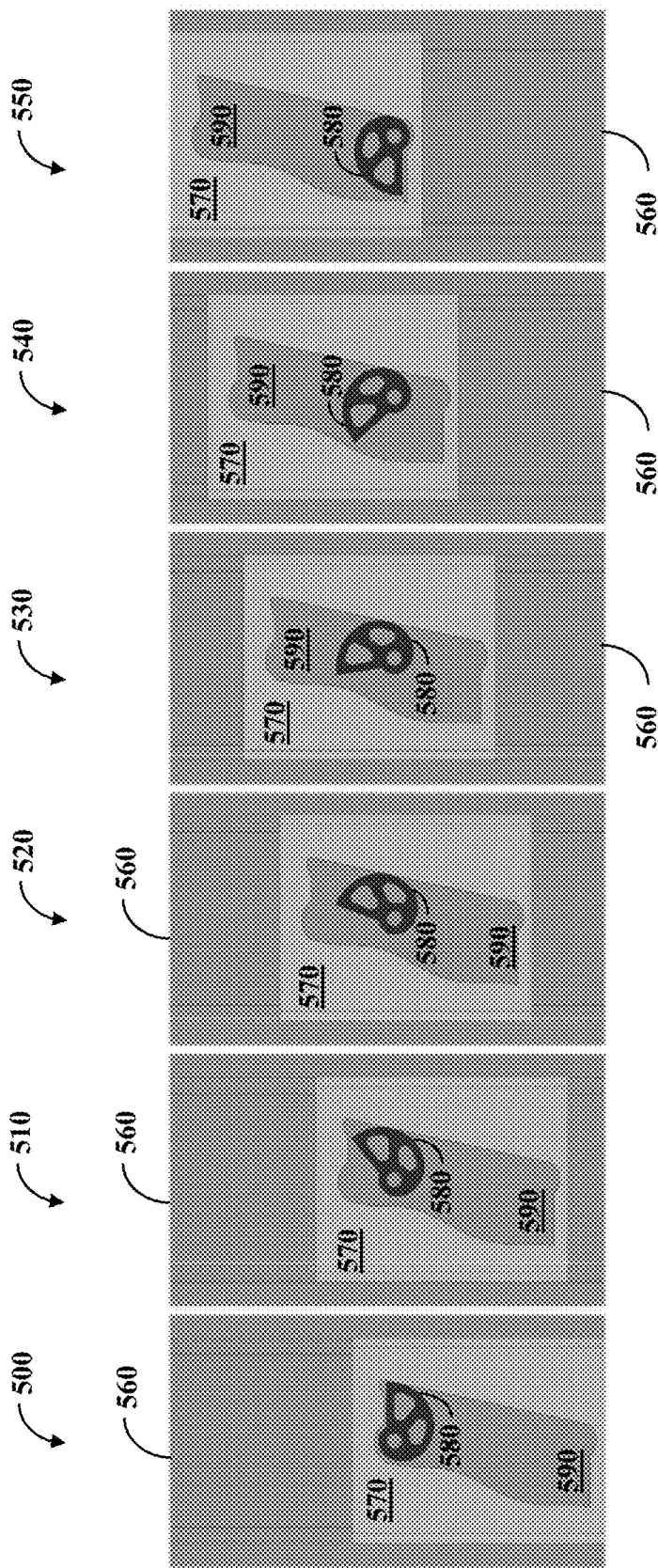
FIG. 5 illustrates one embodiment of a system in a motion sequence with six phases.

FIG. 5 illustrates one embodiment of a sequence of a shoe insole 560 with six phases 500-550. The sequence shows a rack 570 at different points and how a pinion gear 580 moves in its rotation. The rack has an open space 590 custom designed for the rack 570 so that the pinion gear 580 can freely move, yet the rack 570 can have a maximum amount of physical support.

From 500-550 can be considered a sequence during a heel strike while from 550-500 can be considered a sequence during a heel lift. At 500, the rack 570 can be at a heel-side position. When a user steps down, the rack 570 moves from the heel-side position (posterior) to a toe-side position (anterior) that can be seen in 550. When the user lifts a foot after the step down, the rack 570 moves from the toe-side position to the heel-side position, 550 to 500, and ready for a next step. In an alternative embodiment, the opposite can occur such that the heel strike causes the rack to move from toe to heel and the heel lift moves from heel to toe.

Figure 6:
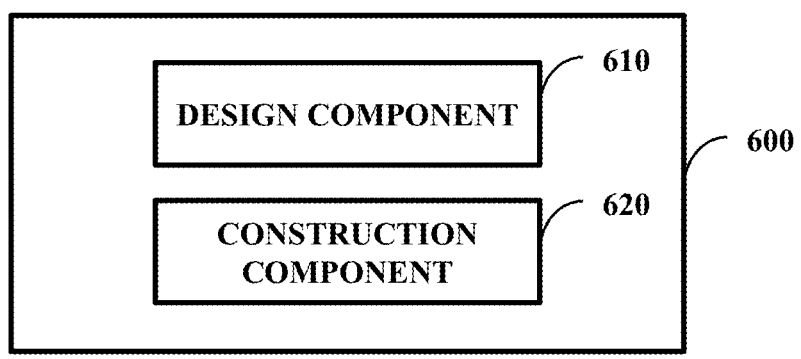
FIG. 6 illustrates one embodiment of a system comprising a design component and a construction component.

FIG. 6 illustrates one embodiment of a system 600 comprising a design component 610 and a construction component 620. The system 600 can manufacture at least part of the shoe insole 560 of FIG. 5. In one example, a user can enter parameter information, such as shoe size (the larger the shoe size, the more available area). Based on the parameter information, the design component 610 can design a shape of the open area 590. This shape can allow for complete desired rotation of the pinion 580 of FIG. 5 without obstruction from the rack 570 of FIG. 5, yet minimize an amount removed from the rack 570 of FIG. 5 so the rack 570 of FIG. 5 has maximum structural support or meets a minimal structural support threshold. The design component 610 can transfer the design to the construction component 620 and based on the design the construction component 620 can construct the rack 570 of FIG. 5 (e.g., hollow out the open area 590 of FIG. 5 through laser cutting), build the pinion gear 580 of FIG. 5 to fit in an opening (e.g., through three-dimensional printing), and/or construct the shoe insole 560 of FIG. 5/a shoe with the shoe insole 560 of FIG. 5. From this, the construction component 620 can output the shoe insole 560 of FIG. 5 or the shoe.

Figure 7:
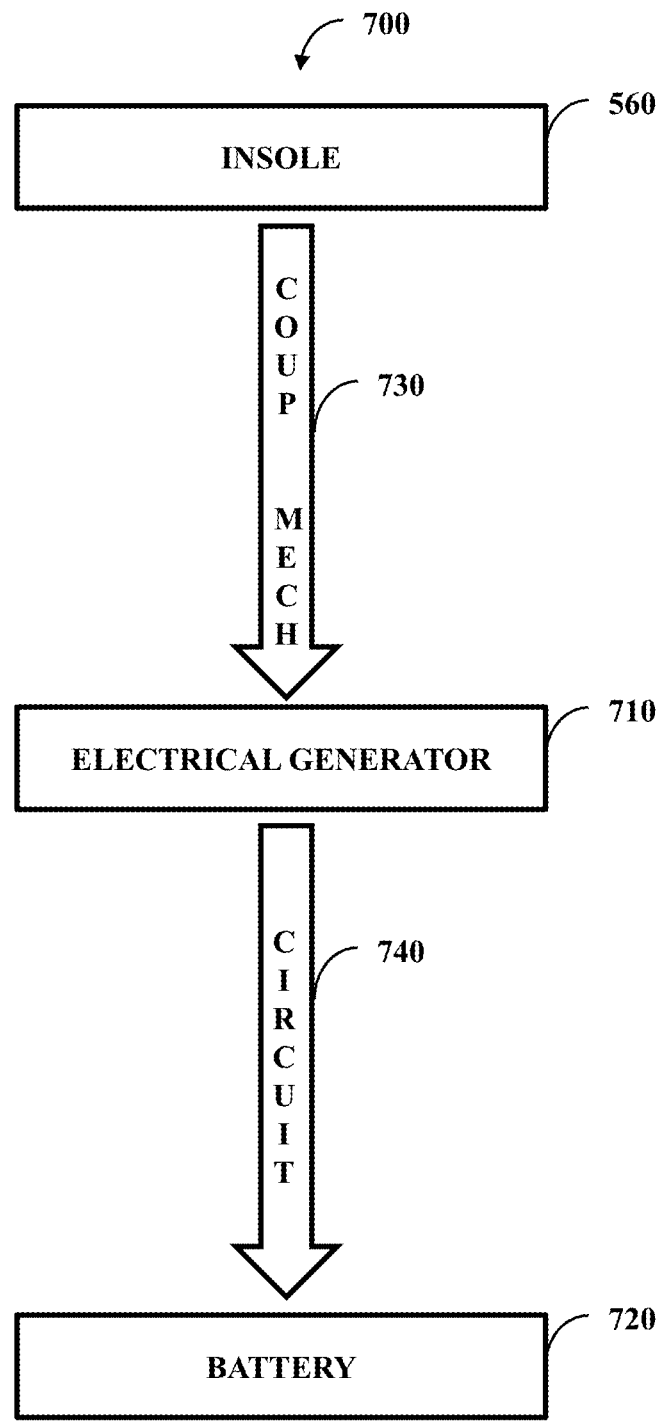
FIG. 7 illustrates one embodiment of a system comprising the insole, an electrical generator, and a battery.

FIG. 7 illustrates one embodiment of a system 700 comprising the insole 560, an electrical generator 710, and a battery 720. While shown as separate and distinct, the electrical generator 710 and/or the battery 720 can be part of the insole 560. A coupling mechanism 730 can couple the pinion gear 580 of FIG. 5 with the electrical generator 710 such that when the pinion gear 580 of FIG. 5 experiences a rotation, the coupling mechanism 730 experiences a rotation. The rotation of the coupling mechanism 730 can cause rotation of at least part of the electrical generator 710 such that the electrical generator produces an electricity. The electricity can be transferred to the battery 720, such as by way of a circuit 740 or wireless transfer.

Discussed above is a heel-side position to a toe-side position movement responding to a heel strike and a toe-side position to a heel-side position movement responding to a heel lift. The coupling mechanism 730 can function with a ratchet. The ratchet can cause the coupling mechanism 730 to engage with the electrical generator 710 and/or the insole 560 during the heel strike and not engage during the heel lift. This way, the electrical generator 710 spins in one direction and not an opposite direction.

Figure 8:
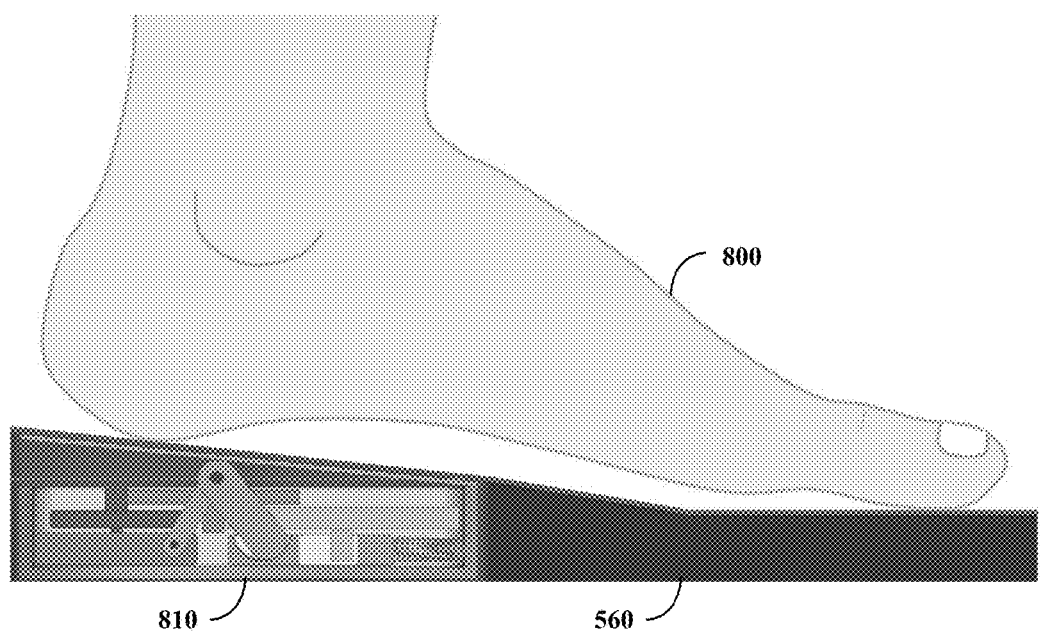
FIG. 8 illustrates one embodiment of a foot and the insole with a mechanical portion.

FIG. 8 illustrates one embodiment of a foot 800 and the insole 560 with a mechanical portion 810. The foot 800 is in position before a heel strike and/or after a heel lift. While illustrated as occupying a heel portion of the insole 560, the mechanical portion 810 can be implemented in other configurations.

Figure 9:
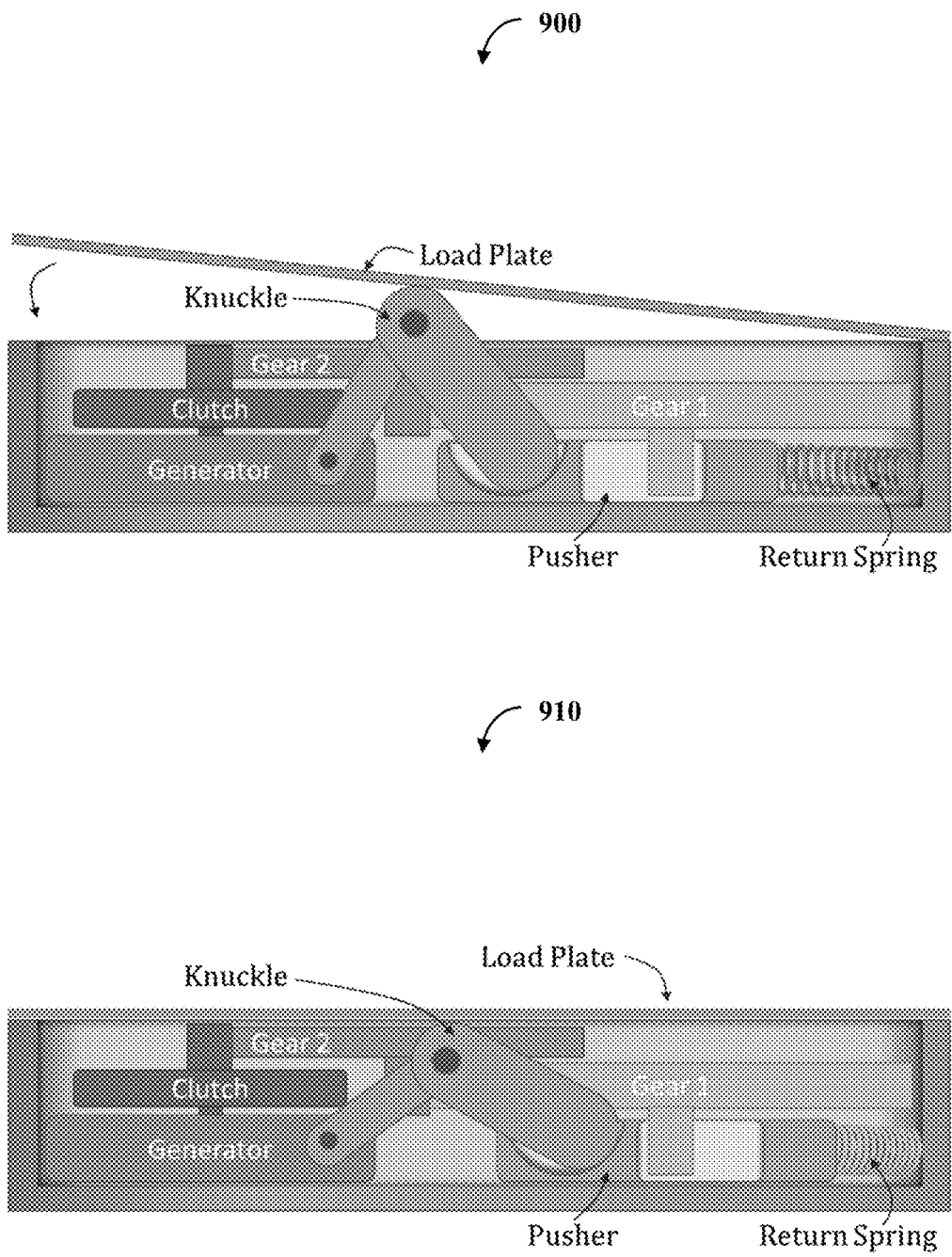
FIG. 9 illustrates two embodiments of the mechanical portion—a pre-heel strike embodiment and a post-heel strike embodiment.

FIG. 9 illustrates two embodiments of the mechanical portion 810 of FIG. 8—a pre-heel strike embodiment 900 and a post-heel strike embodiment 910. A knuckle can be used to convert linear motion, such as converting a north-to-south motion (superior to inferior) to east-to-west motion (anterior to posterior). A user places pressure on a load plate and the load plate pushes down the knuckle. The knuckle connects to a pusher that rotates a gear set (e.g., the gear set can function as the coupling mechanism 730 of FIG. 7 or as a rotational mechanism). The pusher can be the rack 570 of FIG. 5 and the pinion gear 580 of FIG. 5 that directly couples with a gear of the gear set such that the coupled gear rotates. While shown as two gears, more or less gears can be used for the gear set.

The knuckle and pusher can function, as an example, as a conversion component configured to convert a force of a heel strike sequence on a shoe insole into a rotational motion of a rotational mechanism (e.g., the gear set). The pusher can be countered by a return spring. The return spring can force the knuckle back to an upright position to receive another north-to-south motion and return the rack 570 of FIG. 5 (while counter-rotating the pinion 580 of FIG. 5). The return spring can be calibrated such that it provides little resistance to the pusher so as not to cause a great force against the rotation, but with enough resistance to return the knuckle. With this, the pusher can linearly move from a neutral position (e.g., heel) to an off-neutral position (e.g., toe) for the north-to-south motion (e.g., heel strike sequence) and for the south-to-north motion (e.g., heel lift sequence) the pusher can move linearly from the off-neutral position to the neutral position. The pusher can cause the gear set to rotate and this rotation can cause a generator to produce electricity.

A clutch can engage the rotational mechanism with the generator such that the electrical generator experiences rotation from the rotational motion of the mechanism. The clutch can function such that engagement occurs after a start of, but before an end of, the north-to-south motion. With this, the rotational movement causes a rotation of an electrical generator during less than a full duration of the heel strike sequence.

For the heel strike sequence, in view of conservation of energy, only so much energy is available. The more energy used to rotate the generator, then the less energy available for mechanical rotation. With this, the generator can function as a source of damping for the mechanical rotation and produce more counter-torque for the mechanical rotation. It can also be considered that it takes more force to overcome resting inertia than continuing movement for the mechanical rotation. In view of this, the circuit 740 of FIG. 7 can function such that initially a gear is not engaged with the generator. Without the generator connected electrically to a circuit, the generator is not a source of damping for mechanical rotation. When the resting inertia is overcome, the circuit 740 of FIG. 7 can cause the generator to be engaged electrically. In one embodiment, the generator can function as a flywheel to manage when to engage.

Figure 10:
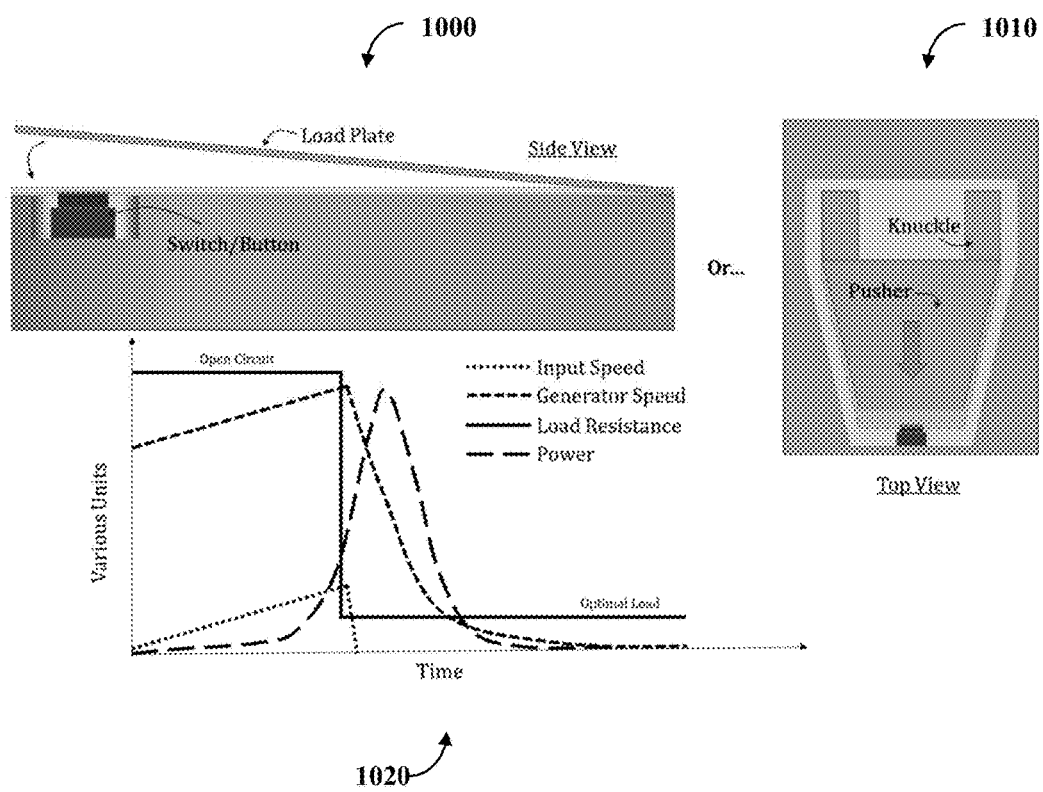
FIG. 10 illustrates one embodiment a first switch/button configuration, a second switch/button configuration, and a graph.

FIG. 10 illustrates one embodiment a first switch/button configuration 1000, a second switch/button configuration 1010, and a graph 1020. In one embodiment the configuration 1000 is a side view and the configuration 1010 is a top view of a single implementation. The circuit 740 of FIG. 7 can be operated by a button or a switch. The load plate can push down the knuckle as seen in FIG. 9. Pushing down on the knuckle can cause rotation of the gear set seen in FIG. 9. However, until the button is pressed the circuitry 740 of FIG. 7 does not engage with the generator. As the load plate nears touching the insole, the button can be pressed engaging the generator when at increase speed (e.g., maximum speed) to cause electrical current flow. Electrical energy generation can be increased (e.g., maximized) when generator speed is increased.

With this, the insole can comprise a harvesting circuit. The button or switch (e.g., circuit completion hardware switch) can cause the harvesting circuit to be open at the start of the heel strike step sequence. Once the switch is engaged by the load plate, the harvesting circuit closes so that the harvesting circuit is closed at the end of the heel strike step sequence. This closes circuit can cause the generator to rotate.

In the configuration 1000, the button is near the load plate. In the configuration 1010, the button is at a toe-side of the insole. The graph 1020 gives a qualitative illustration of how the relationship and timing of the Input Speed, Generator Speed, Load Resistance, and Power relate with the switch/button.

Figure 11:
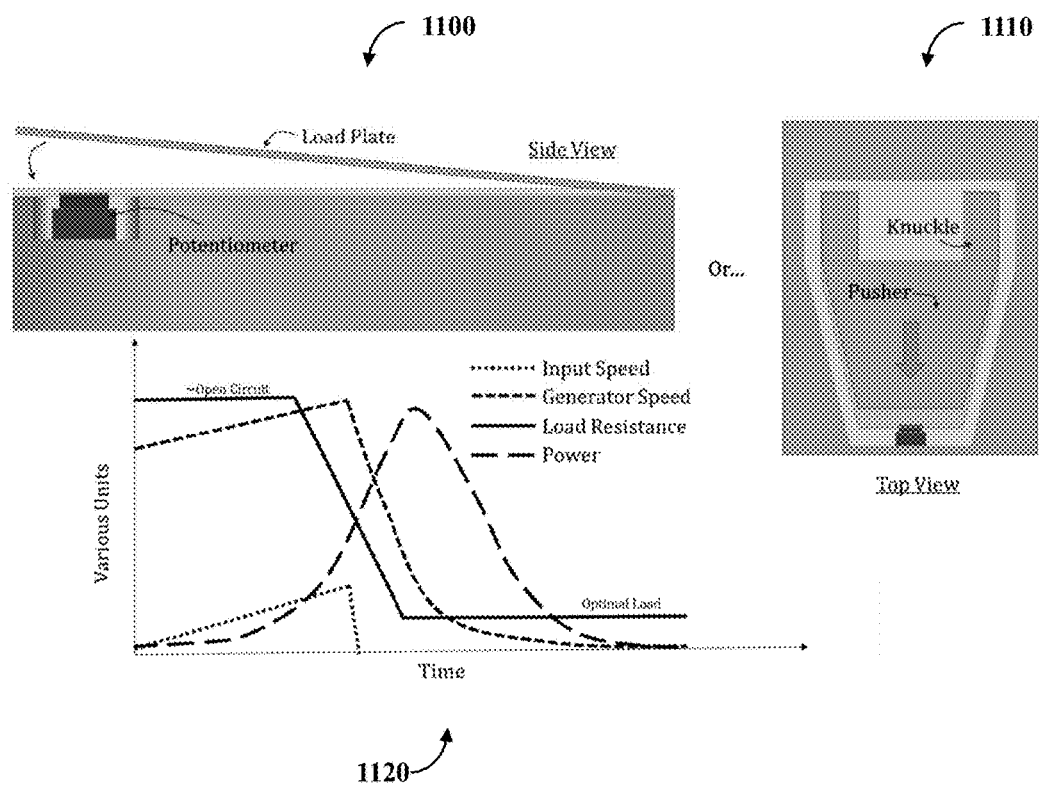
FIG. 11 illustrates one embodiment a first potentiometer configuration, a second potentiometer configuration, and a graph.

FIG. 11 illustrates one embodiment a first potentiometer configuration 1100, a second potentiometer configuration 1110, and a graph 1120. In one embodiment the configuration 1100 is a side view and the configuration 1110 is a top view of a single implementation. FIG. 11 is similar to FIG.

10, except instead of the switch/button a potentiometer is employed. The potentiometer can have a changeable value such that at the start of the heel strike step sequence the harvesting circuit associated with the generator functions similar to an open circuit. Similarly, the changeable value at the end of the heel strike step sequence can be such that the harvesting circuit associated with the electrical generator functions similar to a closed circuit. A controller component can manage changing the value of the potentiometer as well as identifying when to make the change. In one example, the controller component can be implemented as the load plate or the pusher (see FIG. 9). The change in potentiometer resistance value can be actuated by an interaction with the load plate, as in the configuration 1100, or by interaction with the pusher, as in the configuration 1110.

Figure 12:
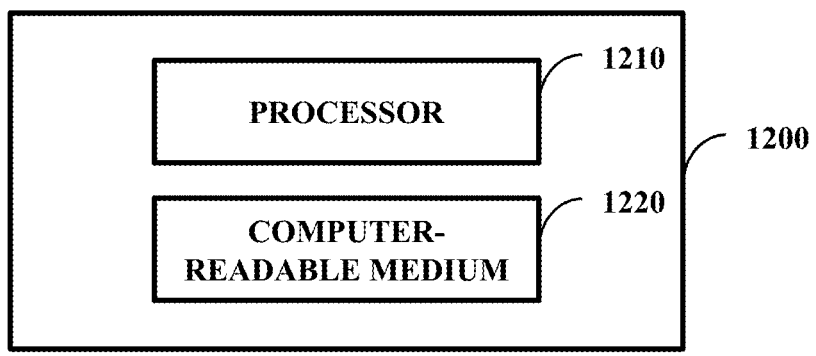
FIG. 12 illustrates one embodiment of a system comprising a processor and a computer-readable medium.

FIG. 12 illustrates one embodiment of a system 1200 comprising a processor 1210 and a computer-readable medium 1220 (e.g., non-transitory computer-readable medium). In one embodiment, the computer-readable medium 1220 is communicatively coupled to the processor 210 and stores a command set executable by the processor 1210 to facilitate operation of at least one component disclosed herein (e.g., the design component 610 of FIG. 6). In one embodiment, at least one component disclosed herein (e.g., the controller component discussed in the previous paragraph) can be implemented, at least in part, by way of non-software, such as implemented as hardware by way of the system 1200. In one embodiment, the computer-readable medium 1220 is configured to store processor-executable instructions that when executed by the processor 1210, cause the processor 1210 to perform at least part of a method disclosed herein (e.g., at least part of one of the method 1300 discussed below).

Figure 13:
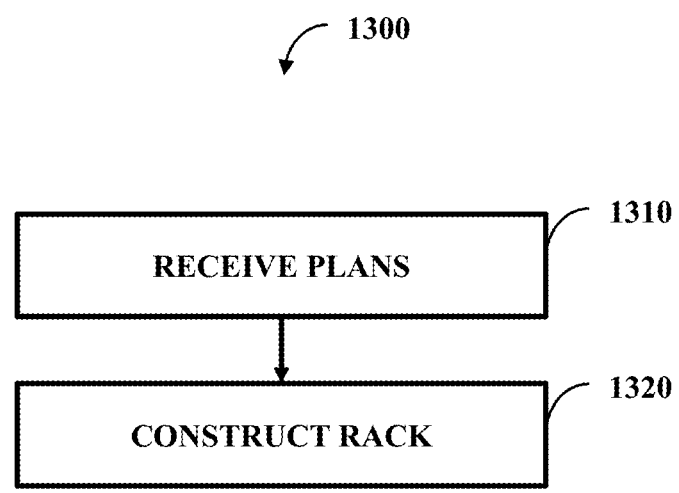
FIG. 13 illustrates one embodiment of a method with two actions.

FIG. 13 illustrates one embodiment of a method 1300 with two actions 1310 and 1320. At 1310, a plan can be received on how to build the rack. As an example, a rack designer can design an opening for the rack based on a specific pinion gear. In response to this, at 1320, the rack can be constructed. This construction can comprise controlling a machine to hollow out a piece of metal.

Figure 14:
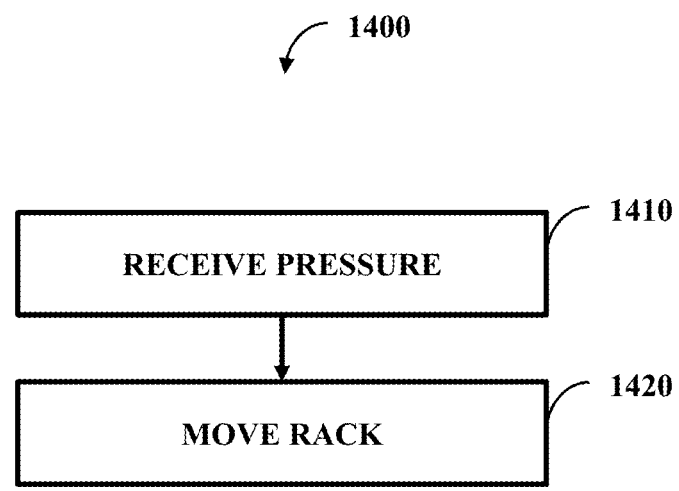
FIG. 14 illustrates one embodiment of a method with the actions.

FIG. 14 illustrates one embodiment of a method 1400 with the actions 1410 and 1420. The actions 1410 and 1420 can be performed by the insole 560 of FIG. 5. At 1410, the insole receives a pressure from a downward step. This downward step can be a heel strike (e.g., only a heel strike or an entire foot strike that includes the heel striking). In response to this pressure, at 1420, the rack 570 of FIG. 5 moves. This movement causes the pinion gear 580 of FIG. 5 to rotate and this rotation causes the electrical generator 710 of FIG. 7 to rotate (e.g., rotation of a disk or rod within a magnetic field).

This rotation of the pinion gear 580 of FIG. 5 can be about a half circular rotation. The pinion gear 580 of FIG. 5 can have a varied gear ratio value higher at a start of the rotation and lower at an end of the rotation. This start value can be a first value and the end value can be a second value. The second value can be equal to one over the first value ($2^{nd}$ value=$1/1^{st}$ value).

Figure 15:
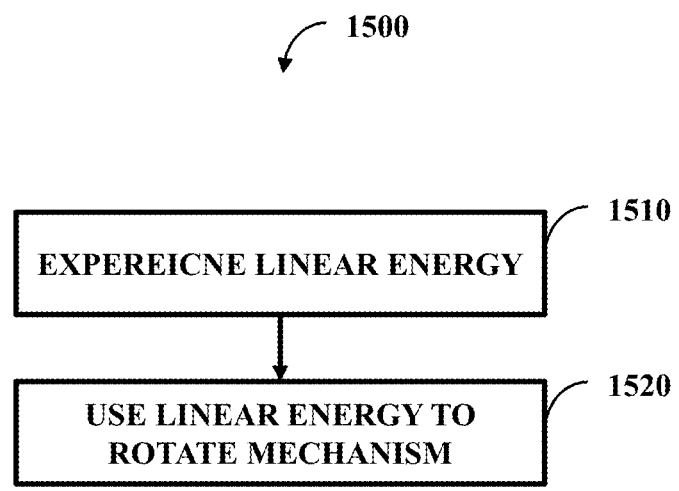
FIG. 15 illustrates one embodiment of a method comprising two actions.

FIG. 15 illustrates one embodiment of a method 1500 comprising two actions 1510 and 1520. The actions 1510 and 1520 can be performed by a shoe mechanism (e.g., the mechanical portion 810 of FIG. 8). At 1510, experiencing a linear energy that is resultant from a heel strike can occur. At 1520, there can be using the linear energy to rotate a rotational mechanism over a first time frame and a second time frame.

While the methods disclosed herein are shown and described as a series of blocks, it is to be appreciated by one of ordinary skill in the art that the methods are not restricted by the order of the blocks, as some blocks can take place in different orders.

What is claimed is:

1. A wearable system, comprising:
a rack; and
a non-circular pinion gear physically coupled to the rack,
where when the rack moves laterally, the non-circular pinion gear experiences a rotation and
where the rack and non-circular pinion gear are inline.

2. The wearable system of claim 1,
where the non-circular pinion gear is physically coupled to a generator and
where the rotation of the non-circular pinion gear causes the generator to generate an electricity.

3. The wearable system of claim 2, comprising:
an insole wearable in a shoe,
where the rack and non-circular pinion gear are integrated in the insole and
where the electricity powers a battery of a personal electronic device of a wearer of the shoe.

4. The wearable system of claim 3,
where when the wearer places a pressure on the insole as part of a step sequence, the rack moves linearly from a heel-side position to a toe-side positon and
where the movement from the heel-side position to a toe-side positon causes the rotation of the non-circular pinion gear.

5. The wearable system of claim 4,
where the rotation is the first rotation,
where when the wearer removes the pressure on the insole as part of the step sequence, the rack moves linearly from the toe-side position to the heel-side position,
where movement from the toe-side position to the heel-side position causes the non-circular pinion gear to experience a second rotation, and
where the second rotation is opposite the first rotation.

6. The wearable system of claim 1,
where the non-circular pinion gear is a singular gear with a larger start radius and a smaller end radius.

7. The wearable system of claim 1, comprising:
an electrical generator
where an insole of a shoe retains the non-circular pinion gear, the rack, and the electrical generator,
where the rotation of the non-circular pinion gear causes rotation of a non-pinion gear, the non-pinion gear being coupled to the non-circular pinion gear and the electrical generator, to cause rotation of at least part of the generator such that the generator generates an electricity,
where the electricity powers a battery of a personal electronic device of a wearer of the shoe,
where a varied gear ratio value of the non-circular pinion gear is lower at a start of the rotation of the non-circular pinion gear,
where the varied gear ratio value of the non-circular pinion gear is higher at an end of the rotation of the non-circular pinion gear,
where when the wearer places a pressure on the insole as part of a step sequence, the rack moves linearly from a heel-side position to a toe-side positon and
where the movement from the heel-side position to a toe-side positon causes the rotation of the non-circular pinion gear and in turn rotation of the generator.

8. The wearable system of claim 1,
where the rotation of the non-circular pinion gear is an about half circular rotation,
where the varied gear ratio value of the non-circular pinion gear at the start of the rotation of the non-circular pinion gear is at a first value,
where the varied gear ratio value of the non-circular pinion gear at the end of the rotation of the non-circular pinion gear is at a second value, and
where the second value is about equal to 1 over the first value.

9. The wearable system of claim 8,
where the non-circular pinion gear comprises an initial transition zone, an intermediary transition zone, and a termination transition zone,
where the initial transition zone has changes of the varied gear ratio value at a first change rate,
where the intermediary transition zone has changes of the varied gear ratio value at a second change rate,
where the termination transition zone has changes of the varied gear ratio value at a third change rate,
where the second change rate is a faster change rate than the first change rate, and
where the second change rate is a faster change rate than the third change rate.

10. A footwear system, comprising:
a pinion gear with a varied gear ratio; and
a coupling mechanism configured to couple the pinion gear to an electrical generator,
where when the pinion gear experiences a rotation, the coupling mechanism experiences a rotation,
where the rotation of the coupling mechanism causes rotation of at least part of the electrical generator such that the electrical generator produces an electricity, and
where the pinion gear is a single gear.

11. The footwear system of claim 10,
where a varied gear ratio value of the pinion gear is lower at a start of the rotation of the pinion gear and
where the varied gear ratio value of the pinion gear is higher at an end of the rotation of the pinion gear.

12. The footwear system of claim 11, comprising:
an insole of a shoe,
where the pinion gear and the coupling mechanism are integrated in the insole of the shoe and
where the electricity powers a battery of a personal electronic device of a wearer of the shoe.

13. The footwear system of claim 12, comprising:
a rack inline with the pinion gear,
where the rack is integrated in the insole of the shoe,
where when the insole of the shoe experiences a pressure, the rack moves linearly, and
where linear movement of the rack causes the pinion gear to experience the rotation.

14. The footwear system of claim 13,
where the rotation is an about half circular rotation of the pinion gear,
where the varied gear ratio value at the start of the rotation of the pinion gear is at a first value,
where the varied gear ratio value at the end of the rotation of the pinion gear is at a second value, and
where the second value is about equal to 1 over the first value.

15. The footwear system of claim 10,
where the pinion gear is non-circular.

16. A method, performed by a shoe insole, the method comprising:
receiving a pressure from a downward step; and
moving a rack in response to the pressure from the downward step,
where moving the rack causes a non-circular pinion gear with a variable gear ratio to rotate and
where the rotation of the pinion gear causes a generator to rotate.

17. The method of claim 16,
where a varied gear ratio value of the pinion gear is lower at a start of the rotation of the pinion gear and
where the varied gear ratio value of the pinion gear is higher at an end of the rotation of the pinion gear.

18. The method of claim 17,
where the rotation is an about half circular rotation of the pinion gear,
where the varied gear ratio value at the start of the rotation of the pinion gear is at a first value,
where the varied gear ratio value at the end of the rotation of the pinion gear is at a second value, and
where the second value is about equal to about 1 over the first value.

19. The method of claim 18,
where the rotation of the generator causes the generator to produce an electricity and
where the electricity powers a battery of a personal electronic device of a wearer of the shoe.

20. The method of claim 16,
where the pinion gear is a single pinion gear.

* * * * *